United States Patent [19]

Kober

[11] Patent Number: 4,615,568
[45] Date of Patent: Oct. 7, 1986

[54] GUIDE DEVICE

[75] Inventor: Hans-Rudolf Kober, Kirchweidach, Fed. Rep. of Germany

[73] Assignee: Dr. Johannes Heidenhain GmbH, Traunreut, Fed. Rep. of Germany

[21] Appl. No.: 648,787

[22] Filed: Sep. 7, 1984

[30] Foreign Application Priority Data

Oct. 4, 1983 [DE] Fed. Rep. of Germany ....... 3336002

[51] Int. Cl.⁴ ..................... F16C 32/06; G01B 21/04; G01D 11/02
[52] U.S. Cl. .................................... 384/12; 33/1 M; 108/143
[58] Field of Search ............. 308/3 R, 3 A, 5 R, 1 R; 384/99, 100; 108/137, 143; 33/1 M; 248/429

[56] References Cited

U.S. PATENT DOCUMENTS 3,658,393 4/1972 Luthi .................................. 384/100
4,118,101 10/1978 Teramachi .................... 308/3 A X

FOREIGN PATENT DOCUMENTS 1258671 7/1968 Fed. Rep. of Germany .
1920063 11/1970 Fed. Rep. of Germany .
2231644 1/1973 Fed. Rep. of Germany .
2346633 4/1975 Fed. Rep. of Germany .
3023837 1/1981 Fed. Rep. of Germany .
1065618 4/1967 United Kingdom .

OTHER PUBLICATIONS

Luftlager by R. Lehmann, A. Wiemer and R. Rogal, from Feingeratetechnik 1962, pp. 151-160.

Primary Examiner—Stuart S. Levy
Assistant Examiner—David Werner
Attorney, Agent, or Firm—Willian Brinks Olds Hofer Gilson & Lione Ltd.

[57] ABSTRACT

The disclosed guide device utilizes no rigidly mounted external guide elements. However, a guide element freely slidable on an air cushion on a flat base can be lowered from the interior of a slide element (by removal of the air cushion) onto the base. Once the guide element has been lowered, it is fixed by subpressure onto the base and takes over the function of a rigidly mounted guide. The guide element, which was previously freely slidable on the base, is now exactly positionable along the guide of the guided element. If the displacement path is to be increased, then the slide piece element is fixed by subpressure on the base, the guide element is again acted upon with compressed air and driven within the slide piece in a displacement direction and at the end of the interior space is again fixed to the base. Now the slide piece is again released and can on its air cushion be further positioned exactly in the displacement direction. This stepwise movement is limited only by the size of the base.

9 Claims, 4 Drawing Figures

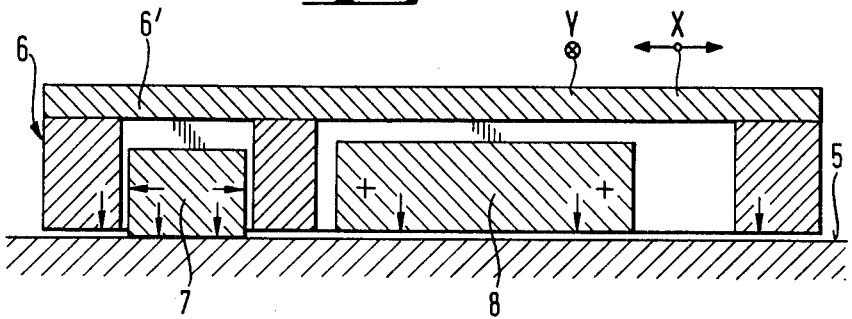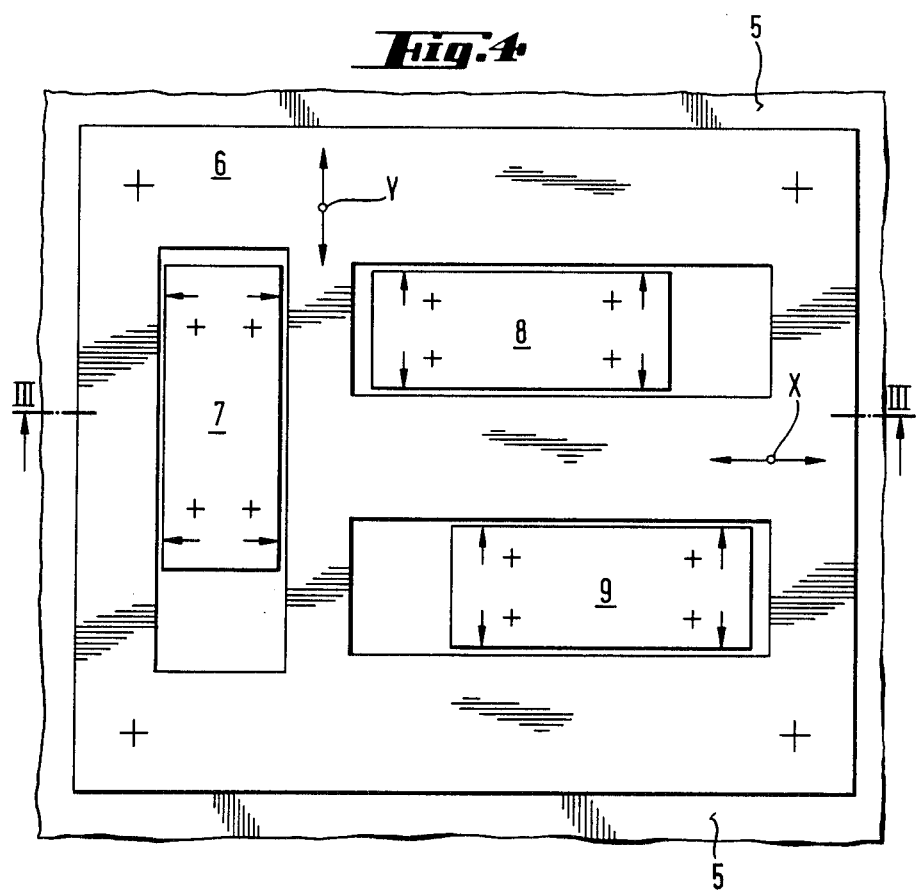

GUIDE DEVICE

BACKGROUND OF THE INVENTION

This invention relates to a guide device of the type used on a base.

For some time, such guide devices have been provided with air bearings. Thus, German Patent DE-PS No. 12 58 671 describes a guide device in which air bearings are provided in conjunction with rigid guide surfaces which are bias tensioned by magnets.

West German DE-OS No. 23 46 693 describes a machine guide in which a guide surface is provided with a separately constructed component which supplies the air bearing, this component being secured against longitudinal displacement.

West German DE-OS No. 30 23 837 discloses another airborne machine guide, the bearing of which is said to present better operating properties, in particular higher loadability and better stability.

All of these prior art devices have in common the feature that the direction of movement of the elements to be guided (for example, a machine slide piece) must be established at the outset. Subsequent changes of the direction or the working range cannot be accommodated. Such a fixing of the orientation of the guiding direction and the working range is, for machines of the type described, logical and sufficient. However, other machines such as measuring machines are often used in a more versatile manner in which it is often quite cumbersome to use fixed direction or working length guides. This is because such guides severely restrict the versatility of use of the measuring instrument.

However, it is precisely in the field of high precision measuring equipment that a high degree of specialized knowledge and manufacturing precision are required to produce suitable measuring instruments. The acquisition of such instruments, therefore, is associated with high costs for the user.

For this reason, measuring machines should be made to operate in as versatile a manner as possible. Known prior art guide devices that are preferably used in measuring machines, however, do not provide the required high degree of versatility. This is because, as mentioned at the outset, the directions of movement and the measuring range are both severely restricted. For this reason, movements in differing coordinate directions in differing spacings to the base of the measuring plane are required. With this approach either the accuracy of measurement is impaired or alternately, compensation calculations must be used to eliminate errors.

SUMMARY OF THE INVENTION

The present invention is directed to an improved guide device which overcomes the disadvantages of prior art guide devices discussed above, and which provides a guide device which is characterized by excellent versatility, high accuracy, relatively low production costs, as well as small structural size.

According to this invention, a guide device is provided which includes a guided element and at least one guide element. At least one fluid bearing is disposed between the guided element and the guide element to facilitate relative movement therebetween in a first direction, and means are provided for selectively and fixedly securing selected ones of the guided element and the guide element are freely movable as a unit on the base when the securing means is deactivated. As used herein, the term "fluid bearing" is used in its broad sense to encompass both air bearings and liquid bearings.

The guide device of this invention provides important advantages in terms of its versatility with respect to the purpose of use, its robust construction, its low structural height, and its movability in every coordinate direction of a plane. The preferred embodiments of this device are free of rigid, external guide elements.

The invention itself, together with further objects and attendant advantages, will best be understood by reference to the following detailed description, taken in conjunction with the accompanying drawings.

BRIEF DESCRIPTION OF THE DRAWINGS

FIG. 3 is a sectional representation of a second preferred embodiment of the guide device of this invention.

FIG. 4 is a plan view of the guide device of FIG. 3.

DETAILED DESCRIPTION OF THE PRESENTLY PREFERRED EMBODIMENTS

Figure 1:
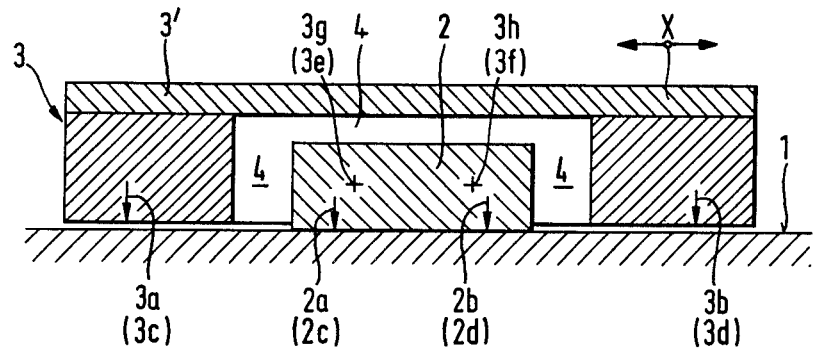
FIG. 1 is a sectional representation of a first preferred embodiment of the guide device of this invention.
Figure 2:
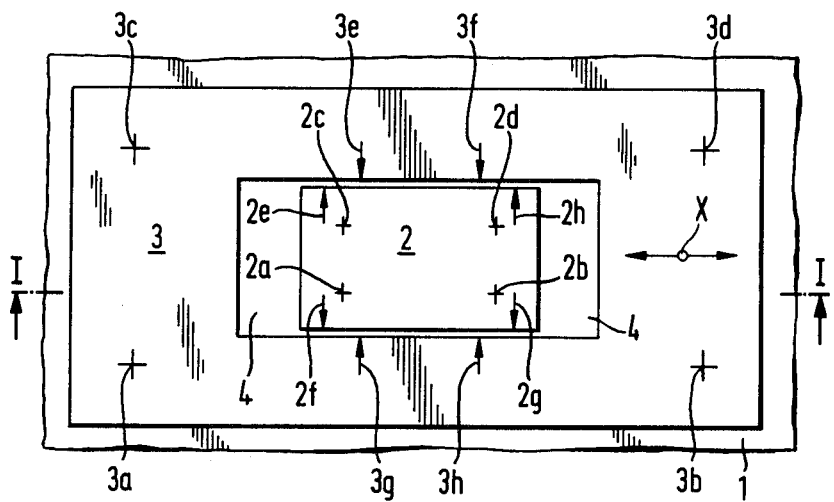
FIG. 2 is a plan view of the guide device of FIG. 1.

Turning now to the drawings, FIGS. 1 and 2 are highly simplified representations of a first preferred embodiment of the guide device of this invention. This simplified representation has been used in order to improve the clarity of the following explanation.

A flat surface of a machine bed (not shown) forms the base 1 of a guide device, on which elements 2 and 3 are supported by air bearings 2a–2d, 3a–3d—which are symbolized by arrows in elevation and crosses in plan view, and which are of a known prior art construction. When the air bearings 2a–2d, 3a–3d are in operation, the elements 2,3 can be made to slide freely and to rotate freely on the flat base 1. In the interior of the element 3 there is a recess 4 which is open towards the base 1. This recess 4 receives the element 2 which is likewise supported by means of air bearings 2e–2h in the recess 4 of the element 3. Alternately, instead of the air bearings 2e–2h in element 2, there can of course be provided air bearings 3e–3h in element 3 which support element 2. The number and dimensioning of the air bearings are governed according to standard technical considerations.

Element 2, therefore, by reason of the highly precise air bearings 2e–2h and/or 3e–3h, can be moved in the X direction in the recess 4, but not in any other direction unless the element 3 itself is moved in a direction other than the X direction. Within the element 3, therefore, the element 2 is very exactly guided in one direction. In each of the elements 2,3, the air bearings 2a–2d and/or 3a–3d can be separately switched off and can even be switched over to subpressure (partial vacuum). As a result of this, at the beginning of a working cycle (for example, a measurement) the air bearings 2a–2d, 3a–3d are put in operation. At the starting point for the measurement, the element 2 is brought to a standstill by switching off or switching over to subpressure of its air bearings 2a–2d in order to cause the element 2 to adhere firmly and fixedly to the base 1. The measuring object is present on the element 3 which now forms the slide piece and is slidable along a very precise guide, formed by the element 2. This is because the air bearings of the slide piece 3 and those inside the recess 4 are not switched off.

Thus, by bringing one of the elements 2,3 to a standstill, a guide and slide piece are formed. If, with respect to what has been previously described, the element 3 is halted on the base 1, then the element 2 can be slid precisely in the interior of the recess 4 and can be displaced exactly in the X direction. Thereupon, the element 2 can again be brought to a standstill on the base 1 and the element 3 can be shifted further. In this manner, the guide formed by the element 2 in the X direction can be lengthened. The measuring range therefore is restricted only by the size of the base 1.

For the representation of FIG. 2, the cover 3' of the element 3 has been removed. In FIG. 2b further air bearings are symbolized by arrows and crosses.

FIGS. 3 and 4 show a second embodiment of the guide of this invention adapted for use as a guide in two directions of movement oriented perpendicularly to one another. On a flat base 5 there are arranged elements 6,7,8,9 of which in the manner described above the element 7 is brought to a standstill on the base 5 and thereby forms the guide. The element 6 remains slidable as a slide piece and is precisely slidable in the Y direction. The elements 8 and 9 are made to slide with respect to the base 5 during movement in the Y direction, and thus during movement in the Y direction the elements 8,9 do not perform a guide function and are moved as a unit with the element 6. After reaching the desired Y position, one of the elements 8,9 or both are lowered and thereby brought to a standstill with respect to the base 5. An air cushion is then generated under the guide element 7 to lift the element 7 off of the base 5. Then the guide element 7 is precisely moved with the slide piece element 6 in the X direction as guided by the ones of the elements 8,9 which are held fixedly in place on the base 5.

In this embodiment, The two elements 8,9 are provided in order to allow a stepwise movement of the slide piece element 6 in one direction without lowering the slide piece element 6. The two elements 8,9 can be arranged as shown in FIG. 4 adjacent to one another, and they can of course also be arranged one behind the other in a co-linear arrangement. Obviously, multiple guide pieces can be provided in the Y direction in a manner similar to elements 8 and 9 of FIG. 4 if needed. In FIGS. 3 and 4 reference numerals have been omitted from the air bearings, since they would not contribute to a better understanding.

Relative movement between the elements 2,3,6,7,8,9 can be detected by means of any suitable length measuring system, such as any of a wide variety of prior art photoelectric, inductive, magnetic, interferometric, incremental, and absolute measuring systems. Furthermore, this relative movement can be controlled by any suitable drive device such as known prior art electric motor, pneumatic drive, friction wheel, spindle, drawing means, and gear devices. By suitable evaluation of the measuring data it is possible to determine the path covered per step or with respect to a starting point.

The bringing of the element serving as a guide to a standstill can also be accomplished with the aid of electromagnets.

Of course, it should be understood that a wide range of changes and modifications can be made to the preferred embodiments described above. It is therefore intended that the foregoing detailed description be regarded as illustrative rather than limiting, and that it be understood that it is the following claims, including all equivalents, which are intended to define the scope of this invention.

I claim:

1. A guide device for use on a base, said guide device comprising:

a guided element located on said base;

at least one guide element located on said base;

at least one fluid bearing disposed between the guided element and the guide element to facilitate relative movement therebetween in a first direction; and means for selectively and fixedly securing selected ones of the guided element and the guide element to the base, the other ones of the guided element and the guide element relatively movable in the first direction with respect to the selected one, said guided element and guide element freely movable as a unit on the base when the securing means is deactivated.

2. The invention of claim 1 wherein the securing means operates selectively to secure the guide element to the base such that the guided element is slidable relative to the base, guided by the secured guide element.

3. The invention of claim 1 wherein a plurality of guide elements are provided for said first direction.

4. A guide device for use on a base, said guide device comprising:

a guided element;

at least one guide element;

an additional guide element;

at least one fluid bearing disposed between the guided element and the guide element to facilitate relative movement therebetween in a first direction;

an additional fluid bearing disposed between the guided element and the additional guide element to facilitate relative movement therebetween in a second direction, different from the first direction; and means for selectively and fixedly securing selected ones of the guided element and the guide element to the base, said guided element and guide element freely movable as a unit on the base when the securing means is deactivated.

5. The invention of claim 4 wherein the securing means operates to secure a selected one of the guide elements to the base such that the guided element is slidable relative to the base, guided by the secured one of the guide elements.

6. A guide device for use on a base, said guide device comprising:

a guided element;

at least one guide element;

at least one selectively activatable fluid bearing disposed between the guided element and the base;

at least one fluid bearing disposed between the guided element and the guide element to facilitate relative movement therebetween in a first direction;

at least one selectively activatable fluid bearing disposed between the guide element and the base; and means for selectively and fixedly securing selected ones of the guided element and the guide element to the base, said guided element and guide element freely movable as a unit on the base when the securing means is deactivated.

7. A guide device for use on a base, said guide device comprising:

a plurality of elements, each element defining at least one direction of relative movement with respect to an adjacent element;

at least one first fluid bearing disposed between each of the elements to facilitate relative movement therebetween;

at least one second fluid bearing disposed between each of the elements and the base to facilitate relative movement therebetween, selected ones of the second fluid bearings being capable of activation and deactivation;

means for selectively securing selected ones of the elements to the base, the selected ones operative to perform at least one of the following functions:

(a) guide at least one other non-selected element with respect to the selected one; and (b) prevent at least one other non-selected element from moving relative to the selected one;

the elements freely movable as a unit on the base when the securing means is deactivated.

8. The invention of claim 7 wherein the securing means comprises deactivating selected ones of the second fluid bearings.

9. The invention of claim 7 wherein the securing means comprises means for connecting selected ones of the second fluid bearings to a source of reduced pressure.

* * * * *

UNITED STATES PATENT AND TRADEMARK OFFICE
CERTIFICATE OF CORRECTION

PATENT NO. : 4,615,568
DATED : October 7, 1986
INVENTOR(S) : Hans-Rudolf Kober

It is certified that error appears in the above-identified patent and that said Letters Patent is hereby corrected as shown below:

IN THE SUMMARY OF THE INVENTION

In column 1, line 67, after "element" please insert --to the base. The guided element and the guide element--.

IN THE DETAILED DESCRIPTION OF THE
PRESENTLY PREFERRED EMBODIMENTS

In column 3, line 36, please delete "The" and substitute therefor --the--.

IN THE CLAIMS

In Claim 7 (column 5, line 11), after "deactivation;" please insert --and--.

Signed and Sealed this

Nineteenth Day of April, 1988

Attest:

DONALD J. QUIGG

Attesting Officer  Commissioner of Patents and Trademarks